Figure 1:
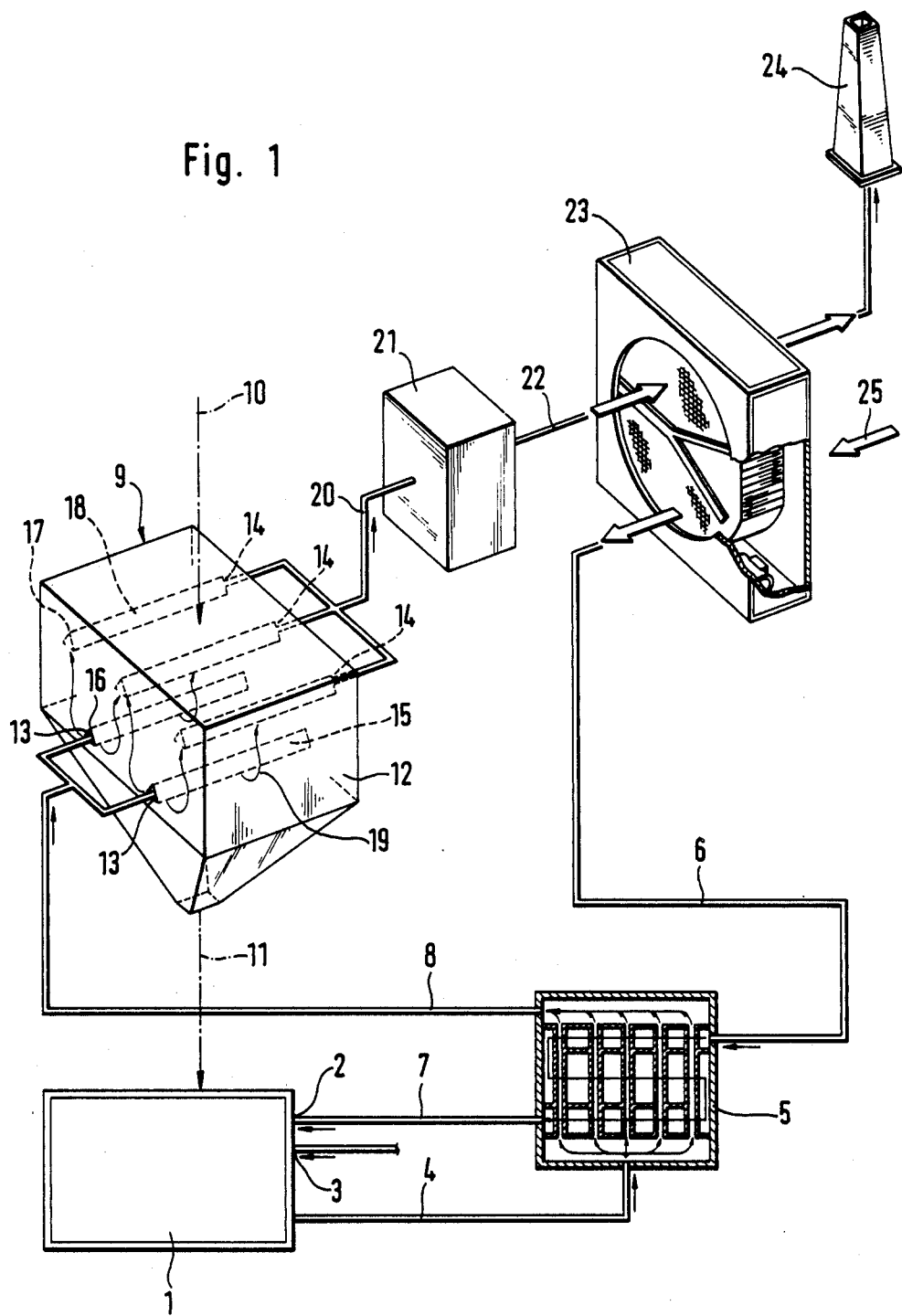

United States Patent [19]

Naber et al.

[11] Patent Number: 4,940,478
[45] Date of Patent: Jul. 10, 1990

[54] METHOD OF MELTING RAW MATERIALS

[75] Inventors: Wilfried Naber, Ladenburg; Heinz-Jürgen Ungerer, Viernheim; Klaus Sistermann, Neustadt, all of Fed. Rep. of Germany

[73] Assignee: Grünzweig & Hartmann AG, Ludwigshafen, Fed. Rep. of Germany

[21] Appl. No.: 243,240

[22] Filed: Sep. 8, 1988

Related U.S. Application Data

[63] Continuation of Ser. No. 17,147, Feb. 20, 1987, abandoned.

[30] Foreign Application Priority Data

Feb. 20, 1986 [DE] Fed. Rep. of Germany ....... 3605509

[51] Int. Cl.$^5$ ............................................... C03B 5/16
[52] U.S. Cl. .......................................... 65/27; 65/134; 65/335; 209/11
[58] Field of Search ....................... 65/2, 27, 134, 135, 65/335; 209/11

[56] References Cited

U.S. PATENT DOCUMENTS

| 4,225,332 | 9/1980 | Tsay | 65/134 |
| 4,298,369 | 11/1981 | Froberg et al. | 65/27 |
| 4,338,113 | 7/1982 | Hohman et al. | 65/27 |
| 4,349,366 | 9/1982 | Saeman | 65/27 |
| 4,362,543 | 12/1982 | Froberg | 65/27 |
| 4,405,350 | 9/1983 | Propster | 65/27 |
| 4,441,906 | 4/1984 | Propster et al. | 65/27 |
| 4,565,562 | 1/1986 | Song | 65/335 |

Primary Examiner—Robert L. Lindsay
Attorney, Agent, or Firm—Provel, Gambrell, Hewitt, Kimball & Krieger

[57] ABSTRACT

A process of melting silicate raw materials includes the steps of using the tank exhaust gases to heat the combustion air, using the tank exhaust gases to preheat a mixture of raw materials, removing acid gaseous aggressive media from the tank exhaust gases, then using the tank exhaust gases to preheat the combination air. Because the acid gaseous aggressive media are removed from the tank exhaust gases before the tank exhaust gases are used to preheat the combustion air, more heat can be withdrawn from the tank exhaust gases than was heretofore possible, since there is no danger of acid condensation even when the tank exhaust gases are cooled to near ambient temperature.

13 Claims, 3 Drawing Sheets

METHOD OF MELTING RAW MATERIALS

This is a continuation of co-pending application Ser. No. 07/017,147 filed on Feb. 20, 1987 now abandoned.

This invention relates to a process of melting silicate raw materials, particularly in the production of mineral wool, preferably of rock wool from basalt, and to means for use in carrying out the process, which means consist of apparatus for preheating the mixture of raw materials and of apparatus for purifying the tank exhaust gases.

For melting silicate raw materials, particularly of granular basalt but also of compacted pellets or pieces of silicate-containing material, the melting tank is supplied with air at a high rate for the combustion of fossil fuel, such as oil, so that the fuel burns in a large flame on the surface of the molten bath. In the space over the bath surface, the stream of exhaust gases entrains impurities, particularly fluorine, chlorine and sulfur dioxide, out of the molten bath. Because such impurities would pollute the environment, they must be removed by filtration before the tank exhaust gases can be discharged into the atmosphere. Particularly fluorine is contained in a certain proportion in the molten bath, mainly as a flux, and care must be taken to return to the molten bath any fluorine which left said bath, so that the fluorine content of the molten bath will be maintained. Said relationships have been explained more in detail, e.g., in U.S. Pat. No. 4,621,523, and reference is made thereto in that respect.

The tank exhaust gases exit at a very high temperature of about 1400° C. It is desirable to use that energy for preheating the combustion air and the mixture of raw materials. Besides, the temperature of the tank exhaust gases must be reduced to a temperature not in excess of 450° C. before the polluants can be removed in an electrostatic precipitator, and to a temperature below 200° C. before the polluants can be removed in a mechanical cloth filter because certain temperature limits must not be exceeded in such filters.. For this reason it has often been proposed first to subject the tank exhaust gases to a preferably recuperative heat exchange with the combustion air in order to extract as much heat as possible from the tank exhaust gases and then to effect a further heat exchange with the mixture of raw materials. Such operations have been disclosed, e.g., in U.S. Pat. Nos. 4,316,732; 4,330,314; 4,330,316; 4,338,112; and 4,362,543. The last-mentioned patent reflects the final result of the developments which underlie the patents referred to.

The heat exchange between the hot tank exhaust gases and the combustion air supplied at ambient temperature should result in the largest possible temperature rise of the combustion air so that the temperature of the tank exhaust gases will be substantially decreased. A heating of the combustion air to about 900° C. will be accompanied by a cooling of the tank exhaust gases from 1400° C. to about 530° C. By the heat exchange with the mixture of raw materials, such mixture is heated to about 450° C. whereas the tank exhaust gases are cooled to a temperature of about 300° C. and at said temperature can be admitted to a suitable filter, e.g., as described in U.S. Pat. No. 4,362,543 to an electrostatically charged bulk material filter, in which a slight temperature drop takes place under steady-state conditions.

If water-bonded pellets are used as raw material, as is described in U.S. Pat. No. 4,330,314 and 4,338,112, a part of the thermal energy of the tank exhaust gases is used to predry the pellets and the tank exhaust gases are cooled only to about 800° C. by the heat exchange with the combustion air so that the residual energy of the tank exhaust gases will be sufficient for a predrying of the pellets without condensation. If tank exhaust gases at such a high temperature enter the mixture of raw materials, the apparatus for preheating the raw materials must be made of special steel, which is highly expensive, and the combustion air will not be adequately preheated. It is apparent that the need for predrying is detrimental as regards the energy balance of the process.

When a dry mixture of raw materials is used, the combustion air can be effectively preheated but the residual energy content of the tank exhaust gases is not adequately utilized in the preheating of the raw materials.

For this reason it is an object of the present invention to provide a process which permits the energy of the tank exhaust gases to be utilized in an improved manner whereas the additional expenditure involved is minimized.

That object is accomplished by removing acid aggressive media from the hot tank exhaust gases to allow more heat to be withdrawn from the exhaust gases without the danger that acid will condense.

Because the heat exchange between the hot tank exhaust gases and the combustion air is so restricted that the tank exhaust gases are cooled only to a temperature at which they are to be used in the raw materials preheater or to the highest temperature at which the raw materials are still flowable, an optimum utilization of the energy for the preheating of the raw materials will be permitted. Whereas a use of expensive special steels which have an adequate strength even at temperatures in excess of 450° C. in the raw materials preheater is not required, the tank exhaust gases entering said raw materials preheater may be at a temperature of about 650° C. and may leave it at a temperature of about 300° to 350° C. so that the raw materials can be preheated to about 580° C., depending on the entrance temperature of the raw material. It will be understood that the feeding of the tank exhaust gases to the raw materials preheater at a high temperature will reduce the rate at which heat can previously be transferred to the combustion air. But within the scope of the invention that disadvantage will be more than offset if the tank exhaust gases which have been used to preheat the mixture of raw materials are once more subjected to a heat exchange with the still cool combustion air. In that case the residual energy content of the tank exhaust gases, which are still at a temperature of, e.g., 350° C. when they have been used to preheat the mixture of raw materials, will be further utilized to initially heat the combustion air from the ambient temperature to, e.g., 200° C. in a heat exchange in which the temperature of the exhaust gases may drop to 150° C. In that case the initially heated combustion air will be at a temperature of, e.g., 200° C. rather than at ambient temperature as it enters the combustion air preheater for the heat exchange with the hot tank exhaust gases. It is apparent that even though the hot tank exhaust gases are cooled in the preheater from about 1400° C. to, e.g., 650° C. for a maximum preheating of the mixture of raw materials the rate at which heat is transferred to the initially heated combustion air is sufficient to heat said air to 1000° C. The improved utilization of the thermal energy of the hot tank exhaust gases thus results in an improved preheating of the combustion air and in an improved preheating of the mixture of raw materials.

Whereas the combustion air can be preheated by the hot tank exhaust gases in a simple structure consisting of a recuperative heat exchanger, e.g., of ceramic material, if the temperature difference is high, the initial heating of the combustion air can desirably be effected by a regenerative heat exchanger because it has a relatively large heat transfer surface area within a very small space so that a high efficiency can be achieved.

During the heat exchange effected in direct contact with the mixture of raw materials a smaller or larger part of the impurities entrained by the tank exhaust gas, particularly dust and aggressive fluids, such as fluorine, is separated by deposition on the raw material particles and is thus recycled to the molten bath. That part will depend on the matter in which that heat exchange is effected. On the other hand, the tank exhaust gas which has been subjected to the heat exchange with the mixture of raw materials still contains particularly gaseous aggressive fluids, such as fluorine, chlorine and sulfur dioxide, in appreciable quantities. It is desirable that this prevents an excessive temperature drop during the initial heating of the combustion air because the temperature of the combustion gases entering the chimney should not be less than a predetermined value, e.g., of 150° C., so that a condensation of acid below the dew point temperature will be avoided. For this reason it is contemplated within the scope of the invention to subject the tank exhaust gases to a further purification, particularly in order to remove acid, gaseous aggressive fluids. Such a purification of the tank exhaust gases before their use to initially heat the combustion air will reduce the load on a succeeding filter and the pollution of the environment and will afford the special advantage that the residual heat content of the tank exhaust gases can be utilized in a very high degree for the initial heating of the combustion air. This is due to the fact that the temperature at which the tank exhaust gases leave the means for the initial heating and are delivered to the chimney can be reduced further owing to the removal of acid-forming impurities.

Special advantages will be afforded if, the impurities which are recycled to the molten bath consist not only of the impurities which have been deposited on the mixture of raw materials but also the impurities which are extracted during the further purification, particularly impurities, such as fluorine, which have been extracted from the molten bath.

A special advantage will be afforded if the means for preheating the mixture of raw materials are designed as is disclosed in Published German Application 28 55 492. Such a design is structurally simple and ensures an intimate contact between the tank exhaust gas and the mixture of raw materials.

But that practice will result in rather high relative velocities also in the region in which the tank exhaust gas leaves the mixture of raw materials so that impurities, particularly dust, are entrained at a substantial rate by the tank exhaust gas stream leaving the raw materials preheater.

For this reason it is contemplated within the scope of the invention to provide a plurality of distributed inlet and outlet openings, which have respective flow passages and are associated with each other. As a result, the tank exhaust gas is homogeneously distributed in the mixture of raw materials and the velocity of flow of the tank exhaust gases is reduced particularly in the exit region so that the rate at which impurities, particularly dust, are entrained by the tank exhaust gases leaving the mixture of raw materials will be minimized. The apparatus which succeeds the raw materials preheater and serves to purify the tank exhaust gases preferably has the basic design which is known from U.S. Pat. No. 4,362,543.

In that known purifying apparatus the filter particles move from top to bottom through the narrow chamber provided in the container and during that movement are contacted by the flowing tank exhaust gases. The filter particles are electrostatically charged to cause impurities to adhere to the filter particles. The spent filter particles are delivered to an expansion chamber in which the filter particles are separated from the adhering dustlike impurities.

But the electric charging of the filter particles will make the plant more complex and less reliable in operation and will promote only to a limited degree the adhesion of dust to the moving filter particles. As a result, dust and gaseous impurities which have entered and are contained in the dust will escape from the purifying apparatus at a substantial rate.

In order to prevent this it is contemplated to divide the container of the purifying apparatus into several chambers in which the tank exhaust gases can flow between the filter particles while the latter are at rest, and to shut off any chamber from the stream of tank exhaust gases before spent filter particles are removed from said chamber. As a result, the filter particles contacted by the tank exhaust gases will always be at rest so that dust adhering to said particles will not be released as a result of relative movements. Nevertheless it is possible to remove spent filter particles and to replace them by fresh filter particles in a continuous operation. This does not preclude the adoption of additional measures for the collection of dust in the system, e.g., by means of cyclone separators, and of measures adopted for a further improvement of the adhesion of dust to the filter particles, such as the application of an electric charge.

The tank exhaust gases may be introduced into and discharged from the filter particle beds in the several chambers through flow passages which are defined by a roof-shaped top cover and by filter particles lying under said cover at the natural angle of repose. Just as in the apparatus for preheating the mixture of raw materials that arrangement will ensure a homogeneous supply of the tank exhaust gases and an intense contact of said gases with the filter particles.

The flow passages may be arranged in tiers arranged one over the other and may be staggered so that tank exhaust gases appearing at the side edges of two adjacent inlet passages will be collected in and discharged by a common outlet passage disposed on a higher level in an arrangement in which the tank exhaust gases are received by and discharged from the container on opposite sides thereof.

In an arrangement which has a particularly simple structure, all chambers are preceded on the inlet side of the flow passages by a common exhaust gas receiving space, from which the tank exhaust gases can enter the open ends of all inlet passages, and on the opposite side the tank exhaust gases are discharged into separate exhaust gas collecting spaces which are associated with respective chambers and can selectively be shut off. In that case the shutting off of a given exhaust gas collecting space will prevent by fluid dynamics also an entrance of tank exhaust gases from the exhaust gas receiving space so that there will be no flow and no discharge of dust which has been released from spent filter particles as they are removed from the chamber.

The partitions which separate adjacent chambers preferably extend in the vertical planes of inlet passages and thus bisect said passages and cause the two halves of each inlet passage to be associated with respective adjacent chambers. Even if the chambers are narrow and have a width that is less than twice the width of two V-shaped roofs defining the flow passages that design will ensure that each outlet passage will be associated with a single exhaust gas collecting space, which communicates with the associated chamber, whereas the inlet passages need not be definitely associated with respective chambers because they open into a common exhaust gas receiving space.

In accordance with U.S. Pat. No. 4,362,543 the filter particles are regenerated in a separating chamber, in which adherent dust is separated from the filter particles and is supplied to the melting tank whereas the filter particles from which the dust has been removed are recycled to the container of the purifying apparatus. But such regeneration will not restore the initial sorption capacity of the filter particles for gaseous impurities, particularly their capacity to absorb fluorine. Fluorine can enter the crystal lattice structure of the filter particle to a very large depth so that the capacity to absorb fluorine is inherently high. But that capacity will be reduced by the fact that other gaseous impurities, such as particularly chlorine, are sorbed only near the surface and will then constitute a barrier layer that prevents a further penetration of fluorine. As a result, the sorption capacity of filter particles will quickly be exhausted after a treatment as taught in U.S. Pat. No. 4,362,543 although the filter particles have been saturated with gaseous impurities only at their surface whereas the interior of the filter particle is not accessible in any case for numerous gaseous impurities, such as particularly chlorine, and is not accessible to fluorine because it cannot penetrate through the outer barrier layer consisting of other impurities.

For this reason a particularly preferred embodiment of the invention resides in that the filter particles are regenerated in the purifying apparatus in that dust is separated and surface layers of the filter particles, which surface layers contain the impurities in a high concentration, are rubbed off, so that deeper layers are exposed and again permit an unrestricted penetration of fluorine to a large depth and a sorption of other impurities, such as particularly chlorine, near the surface.

The means for rubbing off the surface layers preferably consist of a shaking sieve, which is particularly simple, reliable in operation and effective. Preferably the abrading action of the shaking sieve is promoted in that the filter particles to be regenerated are conveyed between the container and the shaking sieve or other means for rubbing off surface layers by means of vibrating conveyors on which the abrasion begins.

Figure 2:
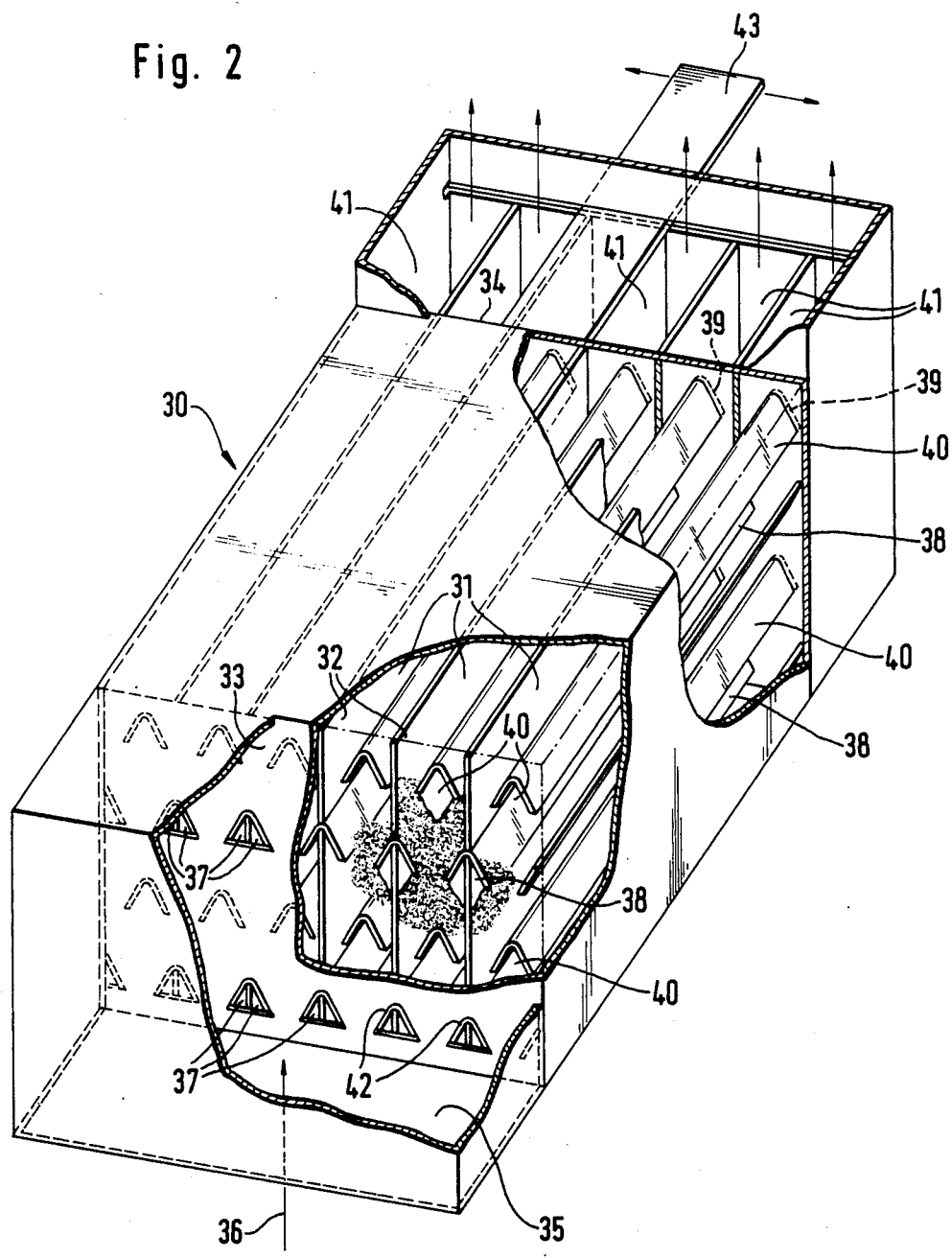
Figure 3:
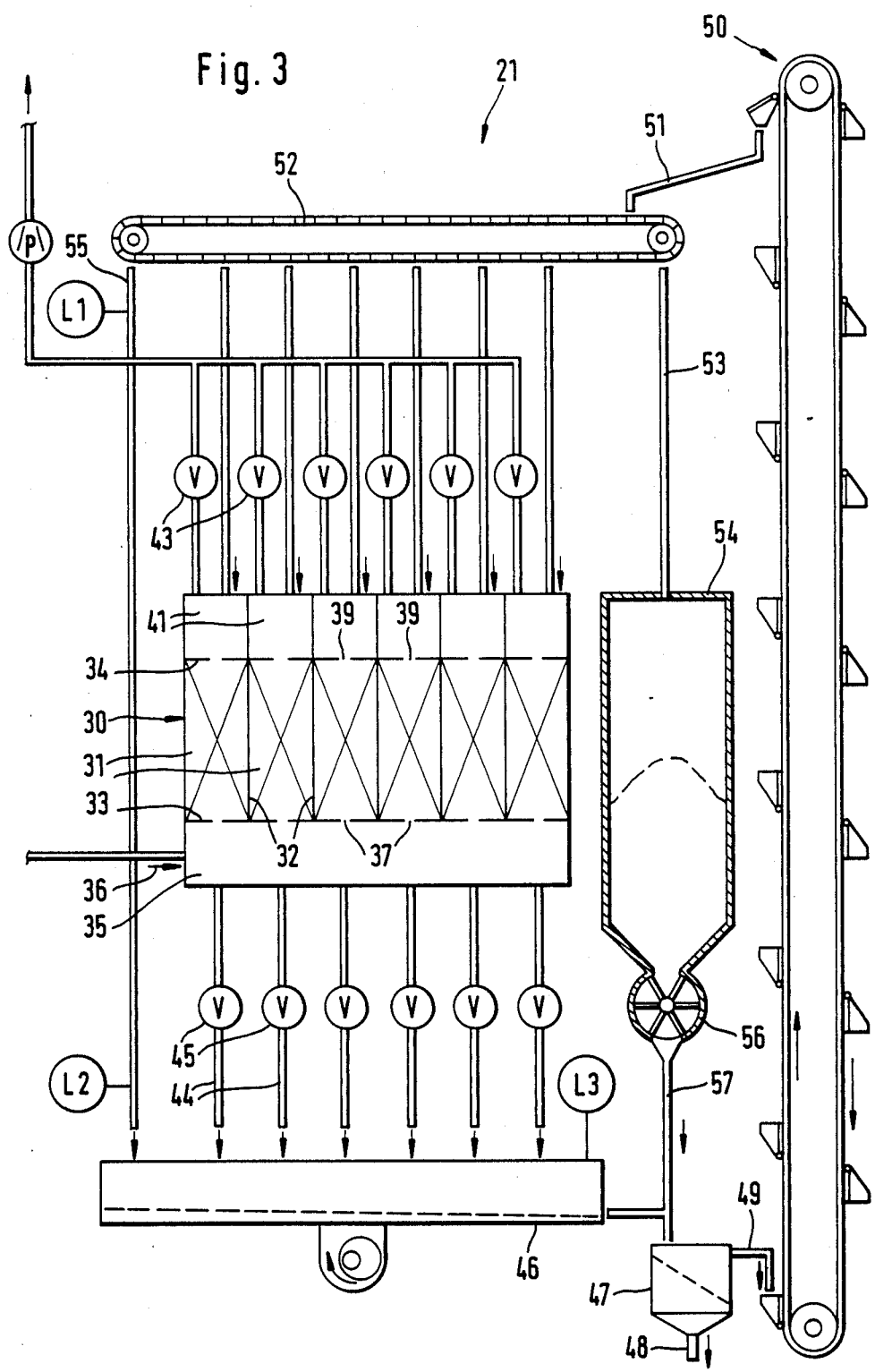

Further details, features and advantages of the invention will become apparent from the following description of an embodiment with reference to the drawings, in which;

FIG. 1 is a diagrammatic representation of the process in accordance with the invention, FIG. 2 is a simplified diagrammatic perspective view showing the container of the purifying apparatus with the walls partly broken away and FIG. 3 is a sketch illustrating the principle of the purifying and regenerating apparatus.

FIG. 1 shows a conventional melting tank 1 such as is used to melt silicate raw materials, e.g., in the production of mineral wool. To supply the thermal energy required for the melting process, combustion air is supplied at 2 and a fossil fuel such as gas or oil is supplied at 3 into the space above the molten bath and an elongate flame is thus formed on the surface of the bath. The tank exhaust gases thus produced are discharged from the melting tank 1 in a diagrammatically indicated duct 4 and are supplied to a heat exchanger 5, which consists, e.g., of a countercurrent recuperator. Combustion air is supplied to the heat exchanger in line 6 as the fluid to be preheated by heat extracted from the tank exhaust gas. From the heat exchanger 5 the combustion air is delivered in a line 7 to the melting tank 1. Tank exhaust gases are conducted from the heat exchanger 5 in a line 8 to a raw materials preheater 9, which in the direction indicated by the arrow 10 is supplied with a mixture of raw materials that is at ambient temperature. From the preheater 9, the mixture of raw materials which has been preheated in contact with the tank exhaust gases is discharged into the melting tank 1 as is indicated by the arrow 11.

The raw materials preheater 9 comprises a container 12 which receives the mixture of raw materials and which is provided on one side with inlet openings 13 and on the opposite side with outlet openings 14 for the tank exhaust gases. The inlet openings 13 lead to inlet flow passages 15 for the tank exhaust gases. Said inlet flow passages 15 are defined at their top by a sheet metal roof 16 having the configuration of an inverted V and are defined on the underside by a mixture of raw materials at the natural angle of repose. At that end which is opposite to the inlet openings 13, the inlet flow passages 15 are closed by the adjacent side wall of the receiving container 12.

Roofs 17 having the configuration of an inverted V are disposed over the inlet flow passages 15 and are staggered from them. Said roofs 17 define respective outlet flow passages 18, which are closed at one end by that wall of the receiving container 12 that is formed with the inlet openings 13. The other ends of the outlet flow passages 18 are constituted by the outlet openings 14. In that arrangement, tank exhaust gases flow from the line 8 through the inlet openings 13 into the inlet flow passages 15 and across the side edges of the latter enter the mixture of raw materials and flow through said mixture as is indicated by the arrows 19 and are subsequently collected in the upper outlet flow passages 18 and leave the receiving container 12 of the purifying apparatus 9 through the outlet openings 14 to enter a line 20.

The line 20 leads to a purifying apparatus which is generally designated 21 and which in FIG. 1 is only diagrammatically shown and will be explained more in detail with reference to FIGS. 2 and 3. From the purifying apparatus 21 the tank exhaust gases flow in a line 22 to a regenerator, which in the present case consists of a rotary heat exchanger 23 and from the latter are delivered to an exhaust gas chimney 24, in which the tank exhaust gases may be subjected to a final purification or filtration, if desired. The heat exchanger 23 serves to preheat ambient air, which is sucked as is indicated by the arrow 25 and is subsequently conducted in line 6 to the heat exchanger 5.

In the heat exchanger 5 the combustion air should be heated from an ambient temperature of, e.g., about 20° to 30° C. to about 900° C. To that end, heat must be extracted from the tank exhaust gases, which are at a temperature of about 1400° C. in the exhaust gas duct 4, at such a rate that said exhaust gases are cooled to about 530° C. Without the heat exchanger 23, the mixture of raw materials could be preheated in the raw materials preheater 9 to a temperature which is not in excess of about 450° C. and the tank exhaust gases in lines 20 and 22 would be at a temperature from about 300 to about 350° C. and would be discharged into the environment at that temperature.

In accordance with the invention the heat exchanger 23 is used to effect an initial heating of the combustion air from an ambient temperature which lies between −20° C. on a cold winter day and 30° C. on a hot day in summer. The initially heated combustion air flowing in line 6 will be at a temperature between about 130° and about 180° C. In the heat exchanger 5 that initially heated combustion air can be heated to a higher temperature of, e.g., 950° C. by a heat exchange with the hot exhaust gases, which are at 1400° C. and which are thus subjected to a smaller temperature drop to assume a temperature from 600 to 650° C. at which the tank exhaust gases flow in line 8. Said tank exhaust gases can now be used to preheat the mixture of raw materials in the raw materials preheater 9 also to a higher temperature from 520° to 580° C. The temperature selected for the tank exhaust gases flowing in line 8 may be so high that said temperature will be equal to or slightly below the highest permissible operating temperature of the raw materials preheater 9 even on a hot day. This means that the tank exhaust gases flowing in line 8 should be at a temperature of about 650° C. when no special materials, such as ceramic materials, are employed.

During steady-state operation the exhaust gases flowing in lines 20 to 22 will be at substantially the same temperature between 300° and 350° C. so that exhaust gases at that temperature will be available for the initial heating of the combustion air in the heat exchanger 23 and will thus be cooled to 150° to 200° C.

In combination, the measures described hereinbefore have the result that the thermal energy of the tank exhaust gases is utilized not only shown to a temperature of about 300° C. but down to a temperature of about 150° C. so that the combustion gases will be supplied at a higher temperature in line 7 and the mixture of raw materials will be preheated to a higher temperature in the raw materials preheater 9. This will permit a corresponding saving of fossil fuel used to operate the melting tank 1. In the exhaust gas chimney 24 the tank exhaust gases may be at a temperature which does not exceed the highest permissible operating temperature of filter cloths or the like so that the tank exhaust gases can be subjected to a final cleaning in a simple manner. Because the energy required to melt the mixture in the melting tank 1 will be reduced particularly by higher preheating of the mixture, the bath may be maintained at a lower temperature so that the emission of pollutants, particularly fluorine, will be reduced and the tank exhaust gas will inherently have a lower fluorine content. Part of the fluorine will deposit on the mixture of raw materials and will then immediately be recycled to the melting tank 1.

But the tank exhaust gases flowing in line 20 are still substantially contaminated by dust and particularly by aggressive gaseous constituents, particularly fluorine, so that the purifying apparatus 21 primarily serves to protect the succeeding heat exchanger 23 from corrosion. Besides, a removal of the aggressive gaseous impurities, such as fluorine, chlorine and sulfur dioxide, to the highest possible degree will lower the dew point temperature of acid so that the exhaust gases can be cooled to a lower temperature without a risk of a condensation of acid. For this reason and for the sake of a recovery of the impurities from the tank exhaust gases to the highest possible degree, because said impurities are required in the molten bath, the purifying apparatus 21 has a high significance within the scope of the present invention.

FIG. 2 is a perspective view showing a container 30 for receiving lime-containing filter, particles. That container 30 is adapted to be flowed through by the tank exhaust gas from line 20.

The container 30 is divided into a plurality of chambers, e.g., into six chambers 31, which are separated by partitions 32 and are all closed at the inlet end by a confining wall 33 and at the opposite or outlet end by a confining wall 34. The confining wall 33 at the inlet end defines an exhaust gas receiving space 35, which is associated with all chambers and which receives the tank exhaust gases as is indicated by the arrow 36. The confining wall 33 is formed with inlet openings 37, which are disposed adjacent to the partitions 32 and lead to inlet flow passages 38 extending in the chambers 31. The opposite confining wall 34 is formed with outlet openings 39, which communicate with outlet flow passages 40 and open into exhaust gas collecting spaces 41, which are associated with respective ones of the chambers 31.

In the bed of filter particles, the flow passages 38 and 40 are defined by roofs 42, which have the configuration of an inverted V and on their underside define the flow passage 38 or 40 together with filter particles lying at the natural angle of repose. The outlet flow passages 40 are disposed above the inlet flow passages 38 and are so staggered relative to the latter that the exhaust gases which have entered the bed of filter particles across the side edges of the roofs 42 of two adjacent inlet flow passages 38 will be collected in an overlying outlet flow passage 40 which is offset from both said inlet flow passages. From that outlet flow passage 40 the tank exhaust gases pass through the associated outlet opening 39 in the wall 34 into the associated exhaust gas collecting space 41. For that purpose the inlet flow passages 38 are closed by the confining wall 34 and the outlet flow passages 40 are closed by the confining wall 33. In the present embodiment each inlet flow passage 38 bisected by one of the partitions 32 so that the two halves of the entrance flow passage are associated with respective adjacent chambers 31. Each of the outlet flow passages 40 is disposed in the central portion of the associated chamber 31.

To permit each exhaust gas collecting space 41 to be selectively shut off, a movable gate 43 is provided. When the gate 43 is moved to the position shown in FIG. 2 to shut off the exhaust gas collecting space 41 that is associated with a given chamber 31, an inflow of tank exhaust gases from the exhaust gas receiving space 35 through the still open inlet opening 37 of the associated chamber 31 will be prevented because an outflow is no longer possible. Because each outlet opening 39 is associated only with a single exhaust gas collecting space 41 and the entrance flow passages 38 associated with adjacent chambers 31 are separated by the partition 32, there can be no flow out of a chamber 31 that has been shut off by the gate 43.

During operation the gate 43 will always shut off one of the chambers 31 so that no gas can flow through said chamber. In a manner which will be described more in detail hereinafter, the filter particles in said chamber will be removed, freed from dust and regenerated and after an addition of fresh filter particles, if required, will be returned to the same chamber or to a subsequently emptied chamber. Now the gate 43 can be actuated to reopen said chamber for the flow of gases and to shut off another chamber 31, from which the filter particles can now be removed for regeneration. In that operation the tank exhaust gases will always flow through a bed of filter particles which are at rest so that deposited dust will continue to adhere rather than entering the exhaust gas collecting spaces 41 and the succeeding line 32, as would be inevitable if the bed were moving during the sorption operation.

In FIG. 3, the container 30 is diagrammatically shown which is provided with the chambers 31, the exhaust gas receiving space 35 and the exhaust gas collecting spaces 41 and with the gate 43 shown in perspective. Chutes 44 provided with shut-off valves 45 are provided on the material discharge side and serve to remove spent filter particles. Filter particles to be discharged through said chutes are delivered to a vibratory conveyor 46, which consists of a vibratory trough. Form the vibratory trough 46 the spent filter particles are delivered to a vibratory or shaking screen 47, which together with the vibratory conveyor 46 serves as a regenerator for the filter particles in that dust on the surfaces of the filter particles is shaken off and surface portions of the filter particles are rubbed off and together with the dust are delivered to the melting tank in a line 48. The cleaned filter particles are delivered in a line 49 to a bucket elevator 50 and from the latter in a line 51 onto a trough chain conveyor 52.

The vibrating conveyor 46 is designed like a bin drawing channel. Covibrating intermediate bottoms and metering gate valves are incorporated so that bulk material can be withdrawn at a controlled rate from a plurality of chambers 31 of the container 30 at the same time.

The trough chain conveyor 52 serves to distribute the filter particles to the several chambers 31 of the container 30. In a reverse operation the filter material can be delivered in a line 53 to a storage bin 54. The trough chain conveyor 52 is provided with an overflow line 55, which is equipped with a material level probes $L_1$ and $L_2$.

To fill the chamber 31 of the empty container 30, filter particles are delivered from the storage bin 54 by a star wheel feeder 56 and a line 57 to a shaking sieve 47, which consists of a circularly moving shaking screen, to the bucket elevator 50, the line 51 and the trough chain conveyor 52. By the operation of the shaking screen 47 also during the first filling of the chamber it is ensured that the filter particles will be free of dust as they enter the chambers 31 of the container 30.

In the manner explained with reference to FIG. 2, the operation results in an enrichment of deposited dust on the filter particles and in a sorption particularly of fluorine compounds. Owing to the enrichment of dust, the pressure drop of the tank exhaust gas flowing through the purifying apparatus 21 to the outlet side thereof will increase. That higher differential pressure may be sensed as an indication that a regeneration is required.

As soon as the highest permissible differential pressure has been reached, the exhaust gas gate 43 associated with the respective chamber 31 is closed. Under the control of a limit switch, the associated shut-off valve 45 in the chute 44 for discharging the filter particles opens and the filter particles leaving the chute are conveyed by the vibratory conveyor 46 to the shaking screen 47. When a probe $L_3$ indicates the presence of material at the discharge edge of the vibratory conveyor 46, this indicates that the regeneration for the associated chamber 31 has begun.

When dust has been removed and the surfaces have been abraded on the shaking screen, the material is returned by the bucket elevator 50 and the trough chain conveyor 52 into the associated chamber 31.

The probe $L_2$ disposed in the lower portion of the overflow line 55 between the trough chain conveyor 52 and the bucket elevator 50 serves to activate the star wheel feeder 56. As soon as the lower probe $L_2$ no longer indicates the presence of filter particles in the overflow line 55, the star wheel feeder 56 is started and new filter material at a controlled rate is withdrawn from the storage bin 54 and is delivered via the shaking screen 47., the bucket elevator 50 and the trough chain conveyor 52 to the overflow line 55. This will ensure that the quantity which has passed through the shaking sieve 47 will always be automatically compensated from the storage bin 54.

When the regenerating time has expired, the shut-off valve 45 in the associated discharge line 44 is closed. The regeneration is considered to be terminated as soon as the probe $L_3$ indicates an absence of material. Now the gate 43 associated with the corresponding chamber 31 is opened to permit a flow of tank exhaust gases through said chamber.

The probe $L_1$ in the upper part of the overflow line 55 serves only to prevent an overfilling. When that probe indicates the presence of material, the trough chain conveyor 52 will commence a reverse operation to return the surplus filter material into the storage bin 54.

From the foregoing description it is apparent that the cleaning apparatus 21 can be embodied in a compact structure so that a high filter rate per unit of volume can be obtained in a simple and robust structure. This is due to the fact that with the exception of valves there are no moving parts adjacent to the filter container 30 proper. A simple and reliable supply and withdrawal of tank exhaust gases and a homogeneous flow of said gases through the filter material is ensured. The provision of a plurality of chambers and the modular structure provide for a flexibility in the design and for a virtually continuous operation in spite of the periodic cleaning operations. The automatic regeneration does not require a manual control from the outside and combines a most economical consumption of filter material with an optimum regeneration of the filter particles for a removal of dust and for a sorption of gaseous impurities such as particularly fluorine.

We claim:

1. A process of melting raw materials, comprising the steps of:
   (a) supplying heat to a melting tank by combustion of fuel;
   (b) subjecting combustion air to a second heating process by heat exchange with tank exhaust gases, the combustion air being preheated only to such an extent that the tank exhaust gases are cooled to a temperature substantially equal to but not exceeding the highest permissible temperature which can be withstood by a container containing a mixture of raw materials;

(c) preheating the mixture of raw materials by flowing the tank exhaust gases into direct contact with the mixture of raw materials;

(d) removing acid gaseous aggressive media from the tank exhaust gases; and (e) subjecting the combustion air to a first heating process by heat exchange with the tank exhaust gases after the acid gaseous aggressive media are removed from the tank exhaust gases.

2. A process according to claim 1, wherein the first heating process is effected by regeneration.

3. A process according to claim 1, further comprising the step of:

conveying the acid gaseous aggressive media which are removed from the tank exhaust gases to the melting tank.

4. The process of claim 1, 2, or 3, wherein the container which contains the mixture of raw materials comprises at least one laterally disposed lower inlet opening (13) and at least one laterally disposed upper outlet opening (14) for the tank exhaust gases, wherein the inlet opening (13) opens into a horizontal inlet flow passage (15) at a first end thereof, which extends in the mixture of raw materials and is closed at a second end and is defined at its top by a convex roof (16) having an inverted V configuration and is defined at its bottom by the mixture of raw materials at the natural angle of repose of the mixture of raw materials, a plurality of distributed inlet openings (13) and outlet openings (14) are provided and each outlet opening (14) has associated therewith an outlet flow passage (18), which corresponds to the inlet flow passage (15).

5. The process of claim 1, wherein the acid gaseous aggressive media are removed from the tank exhaust gases by means comprising:

a container (30) having lime-containing filter particles therein, the container (30) being divided into several chambers (31) in which the tank exhaust gases can flow through the filter particles, and which chambers are adapted to be selectively shut off in order to prevent a flow of the tank exhaust gases and to permit spent filter particles to be discharged from and fresh filter particles to enter the chambers.

6. The process of claim 5, wherein the chambers (31) contain flow passages (38, 40) for the tank exhaust gases and said flow passages extend in a bed of the filter particles, each flow passages being defined at its top by a convex roof (42) having an inverted V configuration and at its bottom by filter particles at the natural angle of respose of the filter particles.

7. The process of claim 6, wherein:

a plurality of the flow passages (38, 40) in the chambers (31) are arranged in superimposed tiers and are staggered from each other, each flow passage having an inlet end and an outlet end;

some of said flow passages consist of inlet flow passages (38), which are open at the inlet end and closed at the outlet end; and the other flow passages consist of outlet flow passages (40), which are closed at the inlet end and open at the outlet end.

8. The process of claim 7, wherein the container (30) further comprises:

an exhaust gas receiving space (35) which communicates with all chambers (31) at the inlet ends of the inlet flow passages (38);

separate exhaust gas collecting spaces (41) which are associated with respective chambers (31) and are located at the outlet ends of the outlet flow passages (40), each of the exhaust gas collecting spaces having a flow outlet; and means for selectively shutting off the flow outlet of each of said exhaust gas collecting spaces.

9. The process of claim 8, wherein the container (30) further comprises partitions (32) which separate the chambers (31) and which divide each of the inlet flow passages (38) into two halves, which are associated with respective adjacent chambers (31).

10. The process of any one of claims 5–9, further comprising the step of regenerating the filter particles by conveying the spent filter particles to means for rubbing off surface layers in order to eliminate barrier layers which exist close to the surfaces of the spent filter particles and obstruct an ingress of fluorine and consist of absorbed other gaseous constituents.

11. The process of claim 10, wherein the means for rubbing off surface layers consists of a shaking sieve (47).

12. The process of claim 10, further comprising the step of:

conveying the spent filter particles to be regenerated between the container (30) containing the lime-containing filter particles and the means for rubbing off surface layers via vibrating conveyor means (46).

13. A process of melting raw materials, comprising the steps of:

(a) flowing a mixture of raw materials into a melting tank and supplying heat to the melting tank by combustion o fuel to melt the mixture of raw materials;

(b) preheating combustion air with tank exhaust gases exiting the melting tank;

(c) subsequent to step (b), preheating the mixture of raw materials by flowing the tank exhaust gases through and in direct contact with the mixture of raw materials;

(d) subsequent to step (c), filtering dust and acid gaseous aggressive media from the tank exhaust gases by flowing the tank exhaust gases through a first quantity of filter particles which are at rest in a filtering unit;

(e) preheating the combustion air with the tank exhaust gases exiting the filtering unit;

(f) isolating a second quantity of filter particles from the tank exhaust gases; and (g) regenerating the second quantity of filter particles while the second quantity of filter particles are isolated from the tank exhaust gases.

* * * * *